United States Patent Office 2,897,207
Patented July 28, 1959

2,897,207

NEW PHTHALOCYANINE DYESTUFFS

Christian Zickendraht and Eugen Johann Koller, Binningen, Switzerland, assignors to Ciba Limited, Basel, Switzerland No Drawing. Application March 10, 1958
Serial No. 720,054

Claims priority, application Switzerland March 18, 1957

4 Claims. (Cl. 260—314.5)

This invention provides acetone-soluble phthalocyanine dyestuffs which contain sulfonic acid amide groups, each of which contains an alkoxyalkyl group of low molecular weight bound to the amide nitrogen atom.

The invention also provides a process for the manufacture of the aforesaid phthalocyanine dyestuffs wherein a phthalocyanine sulfonic acid halide is reacted with an alkoxy-alkylamine of low molecular weight.

As alkoxyalklyamines of low molecular weight there are used, more especially, those which contain a total of at most 5 carbon atoms and of which the alkoxy group contains at most 2 carbon atoms. As examples of such amines there may be mentioned especially $\beta$-methoxyethylamine, $\beta$-ethoxyethylamine, $\gamma$-methoxypropylamine and $\gamma$-ethoxypropylamine.

As phthalocyanine sulfohalides there are used principally sulfochlorides of copper phthalocyanine, but sulfochlorides of cobalt or nickel phthalocyanine or of metal-free phthalocyanine may be used. The sulfochloride groups may be present in the 4- and/or 3-positions depending on whether they have been made from 4-sulfophthalic acid or whether the groups have been introduced by subsequent sulfonation or by direct sulfochlorination of the phthalocyanine. In the case of phthalocyanines which have been made from polynuclear dicarboxylic acids or dinitriles, for example, from diphenyl-ortho-dicarboxylic acid, the sulfochloride groups may be present in the external nuclei. The number of sulfochloride groups may vary from 1 to 4, and in the case of phthalocyanines made from polynuclear starting materials, the number of sulfochloride groups may be greater. The phthalocyanines may also contain further substituents, for example, halogen atoms.

It is of advantage to use very pure phthalocyanine tetrasulfochlorides. These very pure phthalocyanine tetrasulfochlorides lead to especially valuable results and can be made, for example, by reacting a phthalocyanine sulfonic acid or non-sulfonated phthalocyanine with chlorosulfonic acid at a raised temperature, that is to say, at a temperature above 100° C. and, for example, within the range of 120° C.–140° C., and before isolating the phthalocyanine tetrahydrochloride formed, treating the reaction medium with thionylchloride.

The treatment of the reaction medium which is obtained by a method in itself known with thionyl chloride is advantageously carried out at a temperature not exceeding 85° C. The tetrasulfochloride formed may then be isolated from the reaction medium by a method in itself known, for example, by pouring the mixture onto ice water.

By this method there are obtained very pure phthalocyanine sulfochlorides which are especially suitable for the reaction with alkoxyalkylamines in the process of this invention.

The reaction of the phthalocyanine sulfohalides with the aforesaid alkoxyalkylamines of low molecular weight is advantagetously carried out in an aqueous medium in the presence of an acid-binding agent, such as alkali metal hydroxide or alkaline earth metal hydroxide, an alkali metal carbonate, sodium carbonate or a tertiary base, such as triethanolamine or pyridine. If desired, there may be used as acid binding agent an excess of the alkoxyalkylamine used for the reaction, and the excess of alkoxyalkylamine can be regenerated from its hydrochloride for use in reaction with further phthalocyanine sulphochlorides. The reaction temperature may vary within very wide limits, but it is of advantage to work at low temperatures, for example, within the range of 20° C. to 40° C. It is important to use phthalocyanine sulfochlorides which are free from salt-forming groups, for example, sulfonic acid groups not converted into sulfochloride groups, and which sulfochlorides can be obtained, for example, by the method described above.

The products of the process are new. They are phthalocyanine sulfonic acid amides of which the amide nitrogen atoms are bound to alkoxyalkyl groups of low molecular weight.

They are soluble in organic solvents, such as esters and especially in alcohol and in acetone. They are useful for dyeing natural or artificial resins, waxes, lacquers, and plastic compositions, for example, of cellulose ethers or esters, for example, for spin-dyeing cellulose acetate, artificial silk, and also for dyeing natural or synthetic polymers or condensation products.

With the dyestuffs of this invention it is possible, for example, to dye cellulose acetate artificial silk by spin-dyeing methods, clear blue tints which are fast to chlorine and flue gases.

The following examples illustrate the invention, the parts and percentages being by weight.

*Example 1*

193 parts of copper phthalocyanine are introduced in the course of one hour into 1500 parts of chlorosulfonic acid. The mixture is heated, while stirring, for one hour, at 70–75° C. and the temperature is then raised to 130–135° C. in the course of 1½ hours. The mixture is stirred at that temperature for four hours. After cooling the mixture to 80° C. 600 parts of thionylchloride are added dropwise in the course of one hour, and then the whole is stirred for a further hour at 75–80° C. After being cooled to room temperature, the mass is poured on to ice. The copper phthalocyanine tetrasulfochloride so obtained is filtered off with suction and washed neutral with water. The paste so obtained is stirred in 3000 parts of water and after the addition of 120 parts of N-methoxypropylamine and 100 parts of sodium bicarbonate, the whole is stirred for 12 hours at 35–40° C. The mixture is then diluted with 3,000 parts of water and the acid amide so formed is filtered off. It is a blue water-insoluble powder which dissolves well in acetone and alcohol and dyes cellulose acetate artificial silk in the mass greenish blue tints which are fast to light and washing.

Similar products are obtained by reacting copper phthalocyanine tetrasulfochloride with methoxyethylamine or with ethoxyethylamine. A product which dissolves especially well in alcohol is obtained by reacting the tetrasulfochloride with $\gamma$-ethoxypropylamine.

*Example 2*

89.6 parts of sodium salt of copper phthalocyanine-4:4′:4″:4‴-tetrasulfonic acid are introduced into 525 parts of chlorosulfonic acid. The whole is stirred for 1 hour at 70–75° C., then the temperature is raised in the course of 1½ hours to 130–135° C. and the mixture is maintained at that temperature for 4 hours. After cooling the mixture to 70° C., 195 parts of thionyl chloride are added dropwise in the course of 1 hour and then the whole is stirred for 4 hours at 80–85° C. The mixture is then poured on to ice, and the tetrasulfochloride is filtered off and washed neutral with water. The product is reacted with γ-methoxypropylamine in the manner described in Example 1. When dry the dyestuff so obtained is a blue powder which dissolves well in alcohol and acetone and dyes cellulose acetate artificial silk in the mass greenish blue tints which are fast to light and washing.

What is claimed is:

1. Acetone-soluble copper phthalocyanine tetrasulfonic acid amide, each amide nitrogen atom of which bears an alkoxyalkyl group of at least 3 and at most 5 carbon atoms.

2. The dyestuffs of claim 1, which contain as alkoxyalkyl group an ethoxyethyl group.

3. The dyestuffs of claim 1, which contain as alkoxyalkyl group a methoxypropyl group.

4. The dyestuffs of claim 1, which contain as alkoxyalkyl group an ethoxypropyl group.

References Cited in the file of this patent

UNITED STATES PATENTS

| | | |
|---|---|---|
| 2,224,112 | Krizkalla et al. | Dec. 3, 1940 |
| 2,300,572 | Hoyer et al. | Nov. 3, 1942 |
| 2,744,914 | Rosch | May 8, 1956 |

FOREIGN PATENTS

| | | |
|---|---|---|
| 696,591 | Germany | Sept. 25, 1940 |